United States Patent
Kaneko et al.

(10) Patent No.: US 8,899,837 B2
(45) Date of Patent: Dec. 2, 2014

(54) HALVED SLIDING BEARING AND METHOD FOR PRODUCING SAME

(75) Inventors: Hiroshi Kaneko, Inuyama (JP);
Michitoshi Inagaki, Inuyama (JP);
Tsuyoshi Nakashima, Inuyama (JP)

(73) Assignee: Daido Metal Company Ltd., Nagoya-Shi, Aichi (JP)

( * ) Notice: Subject to any disclaimer, the term of this patent is extended or adjusted under 35 U.S.C. 154(b) by 0 days.

(21) Appl. No.: 13/821,839

(22) PCT Filed: Apr. 2, 2012

(86) PCT No.: PCT/JP2012/058932
§ 371 (c)(1),
(2), (4) Date: Mar. 8, 2013

(87) PCT Pub. No.: WO2013/001881
PCT Pub. Date: Jan. 3, 2013

(65) Prior Publication Data
US 2013/0163904 A1 Jun. 27, 2013

(30) Foreign Application Priority Data

Jun. 30, 2011 (JP) ................................. 2011-145860

(51) Int. Cl.
| | |
|---|---|
| *F16C 33/14* | (2006.01) |
| *F16C 43/02* | (2006.01) |
| *F16C 17/12* | (2006.01) |
| *F16C 17/02* | (2006.01) |
| *F16C 33/02* | (2006.01) |

(52) U.S. Cl.
CPC .................. *F16C 33/02* (2013.01); *F16C 17/12* (2013.01); *F16C 2220/82* (2013.01); *F16C 17/022* (2013.01); *F16C 33/14* (2013.01); *F16C 43/02* (2013.01)
USPC ....... 384/294; 384/296; 384/430; 29/898.057

(58) Field of Classification Search
CPC .......... F16C 33/02; F16C 33/14; F16C 43/02; F16C 17/12; F16C 2220/82
USPC ................ 29/898.054–898.057, 898.07, 428; 384/906, 294–296, 288, 429, 430
See application file for complete search history.

(56) References Cited

U.S. PATENT DOCUMENTS 2,124,060 A * 7/1938 Gilman .................... 29/898.058
3,576,353 A * 4/1971 Barker et al. ................. 384/430
(Continued)

FOREIGN PATENT DOCUMENTS

| JP | 59-50226 A | 3/1984 |
|---|---|---|
| JP | 1222111989 U | 6/1991 |

*Primary Examiner* — Thomas R. Hannon
(74) *Attorney, Agent, or Firm* — Browdy and Neimark, PLLC

(57) ABSTRACT

A halved sliding bearing (1) has a recess (7) formed in a circumferential direction from an outer peripheral edge of a mating surface (5) of a semi-cylindrical bearing main body (3). To prevent formation of a burr to an inside of the recess (7) during formation of the mating surface (5), an entirety of at least one edge segment of a peripheral edge of the recess (7) opening on a circumferential end surface of a semi-cylindrical member (23) as an unprocessed body of the bearing main body (3), the at least one edge segment intersecting with an axial direction of the member (23), is chamfered. The mating surface is formed by cutting the circumferential end surface such that a cutting blade (31) firstly reaches the chamfered edge in the peripheral edge of the recess (7). Thus, the bearing main body is produced.

11 Claims, 7 Drawing Sheets

(56) References Cited

U.S. PATENT DOCUMENTS

| | | | |
|---|---|---|---|
| 4,114,961 A * | 9/1978 | Pithie | 384/430 |
| 4,775,249 A * | 10/1988 | Roemer et al. | 384/296 |
| 4,872,248 A | 10/1989 | Roemer et al. | |
| 5,727,885 A * | 3/1998 | Ono et al. | 384/294 |
| 6,227,709 B1 * | 5/2001 | Lehmann et al. | 384/294 |

\* cited by examiner

HALVED SLIDING BEARING AND METHOD FOR PRODUCING SAME

FIELD OF THE INVENTION

The present invention relates to a halved sliding bearing and a manufacturing method thereof.

BACKGROUND ART

A halved sliding bearing is, for example, mounted to a connecting rod of an automobile engine and is used for smoothly rotating a crankpin of a crankshaft, which is inserted in the connecting rod, relative to the connecting rod.

The halved sliding bearing has a semi-cylindrical bearing main body as a main element, and a recess is formed in a circumferential direction from an outer peripheral end edge of a mating surface of the bearing main body (see Patent Document 1). The recess is formed by pressing a die and plastically deforming a material of the bearing main body. As a result, a protruding part is formed at a lower edge of the recess. The protruding part is used as a positioning member.

There is also a case where a recess is formed by cutting the outer peripheral end edge of the mating surface in the circumferential direction. The thus-formed recess having no protruding part prevents interference with a bolt or the like protruding from a counterpart member.

PRIOR ART DOCUMENT

Patent Document

[Patent Document 1] JP-A-S59-50226

SUMMARY OF THE INVENTION

Problems to be Solved by the Invention

The mating surface is required to have high flatness because the halved sliding bearing is brought into contact with the counterpart member (which is also a semi-cylindrical member) at the mating surface. Therefore, the mating surface is cut in a finishing stage in order to secure the flatness of the mating surface. If the recess is formed in the finishing stage, there is a possibility that deformation caused during the formation of the recess appears on the mating surface. Therefore, it is preferable to form the recess on the mating surface first, and then to cut the mating surface to secure the flatness of the mating surface.

If the recess opens on the mating surface, there is a possibility that the opening serves as a hollow space, and a burr is formed during the cutting of the mating surface. That is, when a cutting blade is pressed against the mating surface and is moved relatively in an axial direction of the bearing main body to flatten the mating surface, there is a possibility that the burr is formed on a peripheral edge positioned upstream the recess since the recess exists as the hollow space downstream in the moving direction of the cutting blade.

There is a possibility that the burr adheres to an inner peripheral surface or an outer peripheral surface (housing attachment part) of the halved sliding bearing, thereby lowering reliability of the halved sliding bearing.

Therefore, trimming for removing the burr is necessary. In order to secure the high reliability of the halved sliding bearing, large man-hours for trimming are required.

If the burr is not formed in the first place, the trimming can be omitted, and it would be the best in order to secure the reliability of the halved sliding bearing.

Means for Solving the Problems

The present invention is made in view of the above problems, and a first aspect of the present invention is defined as follows. That is, a method for manufacturing a halved sliding bearing, which has a recess formed in a circumferential direction from an outer peripheral edge of a mating surface of a semi-cylindrical bearing main body of the halved sliding bearing, the method comprising the steps of:

preparing a semi-cylindrical member as an unprocessed body of the bearing main body, wherein the recess opens on a circumferential end surface of the member, wherein at least one edge segment of a peripheral edge of the recess intersects with an axial direction of the member, and wherein an entirety of the at least one edge segment is chamfered; and forming the mating surface by cutting the circumferential end surface such that a cutting blade firstly reaches the chamfered edge segment in the peripheral edge of the recess, thereby producing the bearing main body.

According to the invention of the thus-defined first aspect, the entirety of the upstream edge, which the cutting blade reaches first in the peripheral edge of the recess, is chamfered. Therefore, even if a space (i.e., a recess) exists downstream the upstream edge, formation of a burr during the cutting and shaping of the mating surface is suppressed. Hereinafter, a surface formed by the chamfering will be referred to also as a "chamfered surface."

A second aspect of the present invention is defined as follows. That is, in the manufacturing method defined in the first aspect, the preparing the member includes the steps of:

forming the recess in the circumferential direction from the outer peripheral edge of the circumferential end surface of the member; and chamfering the peripheral edge of the recess, which opens on the circumferential end surface, after the forming the recess.

According to the manufacturing method of the thus-defined second aspect, shaping freedom of the chamfer is improved, and high productivity can be secured. In another method, a chamfered surface may be formed beforehand on the circumferential end surface, and then a recess may be formed in a region where the chamfered surface has been formed. In this case, the chamfered surface is formed on the upstream edge of the recess, so the formation of the burr during the cutting and shaping of the mating surface can be precluded. However, in this case, highly accurate positioning of the recess with respect to the chamfered region, which has been formed beforehand, is necessary. According to the manufacturing method defined in the second aspect, there is no deformation of the chamfered region during the formation of the recess. Therefore, the risk inducing the burr formation can be reduced remarkably.

A third aspect of the present invention is defined as follows. That is, in the manufacturing method defined in the second aspect, an angle of chamfer (which will be referred to also as a "chamfer angle" hereinafter) with respect to the circumferential end surface is of between 30 and 65 degrees.

In order to prevent the burr formation more surely, the chamfer angle should be preferably as close to zero as possible. However, in this case, an area occupied by the chamfered region in the mating surface increases. When the chamfer angle falls below 30 degrees, there is a possibility that mechanical characteristics intrinsically required of the mating surface are compromised.

As the chamfer angle comes closer to the right angle, the probability of the burr formation increases. According to the study by the inventors of the present invention, the burr is hardly formed when the chamfer angle is 65 degrees or smaller.

The chamfered surface is not limited to a flat surface but may be a curved surface.

In a case where the chamfered surface is composed of multiple surfaces, the surfaces may have the same chamfer angle or may have different chamfer angles. When the surfaces have different chamfer angles, the surface(s) having the chamfer angle(s) of between 30 and 65 degrees may coexist with the surface(s) having the chamfer angle(s) different from the range of between 30 and 65 degrees. At least a chamfered surface that intersects with a moving direction of the cutting blade in the cutting of the circumferential end surface and that is formed on an edge segment reached by the cutting blade first should preferably have a chamfer angle of between 30 and 65 degrees.

From a viewpoint of facilitating the shaping, the chamfering should be preferably performed by cutting (fourth aspect).

The chamfered surface should be preferably formed on an entire peripheral edge of the recess (fifth aspect). Thus, positioning accuracy required during the chamfering can be reduced. Consequently, the shaping performance can be improved and the productivity can be improved.

A sixth aspect of the present invention is defined as follows. That is, a halved sliding bearing comprising:

a semi-cylindrical bearing main body; and a recess formed in a circumferential direction from an outer peripheral side of a mating surface of the bearing main body, wherein at least one edge segment of a peripheral edge of the recess, which opens on the mating surface, intersects with an axial direction of the bearing main body, and an entirety of the at least one edge segment is cut off.

In the thus-configured halved sliding bearing, a part of the peripheral edge of the recess that has a high probability of the burr formation is cut off. Accordingly, the burr formation at the part is suppressed, thereby providing high reliability.

The cutting off should preferably include chamfering (seventh aspect).

An eighth aspect of the present invention is defined as follows. That is, in the halved sliding bearing defined in the seventh aspect, an entirety of the peripheral edge of the recess, which opens on the mating surface, is chamfered.

The halved sliding bearing of the thus-defined eighth aspect is formed through the manufacturing method defined in the above sixth aspect. Accordingly, high productivity is secured, and the halved sliding bearing can be provided at a low cost.

A ninth aspect of the present invention is defined as follows. That is, in the halved sliding bearing defined in the seventh aspect, the angle of the chamfered surface (i.e., the chamfer angle) with respect to the mating surface is of between 30 and 65 degrees. By setting the chamfer angle in such the range, the burr formation can be prevented surely, and also sufficient mechanical stability can be secured in the mating surface. As a result, the halved sliding bearing having the chamfer angle in the above range has high reliability.

In a case where the chamfered surface is composed of multiple surfaces, the surfaces may have the same chamfer angle or may have different chamfer angles. When the surfaces have different chamfer angles, the surface(s) having the chamfer angle(s) of between 30 and 65 degrees may coexist with the surface(s) having the chamfer angle(s) different from the range of between 30 and 65 degrees. In the peripheral edge of the recess opening on the mating surface, at least one edge segment that intersects with an axial direction of the bearing main body should preferably have the chamfer angle of between 30 and 65 degrees.

A tenth aspect of the present invention is defined as follows. That is, a method for manufacturing a semi-cylindrical halved sliding bearing, which has a recess formed in a circumferential direction from an outer peripheral edge of a mating surface of a bearing main body of the halved sliding bearing, the method comprising the steps of:

forming the recess near one end side of a circumferential end surface of a semi-cylindrical member, which serves as an unprocessed body of the bearing main body;

cutting the circumferential end surface between the recess and an end portion of the member on the one end side; and forming the mating surface by cutting the circumferential end surface from the one end side, thereby producing the bearing main body.

According to the manufacturing method of the thus-defined tenth aspect, no mating surface exists upstream the recess. Accordingly, the burr is not formed in the first place.

MODES FOR CARRYING OUT THE INVENTION

The present invention will be described below in more details based on embodiments.

Figure 1:
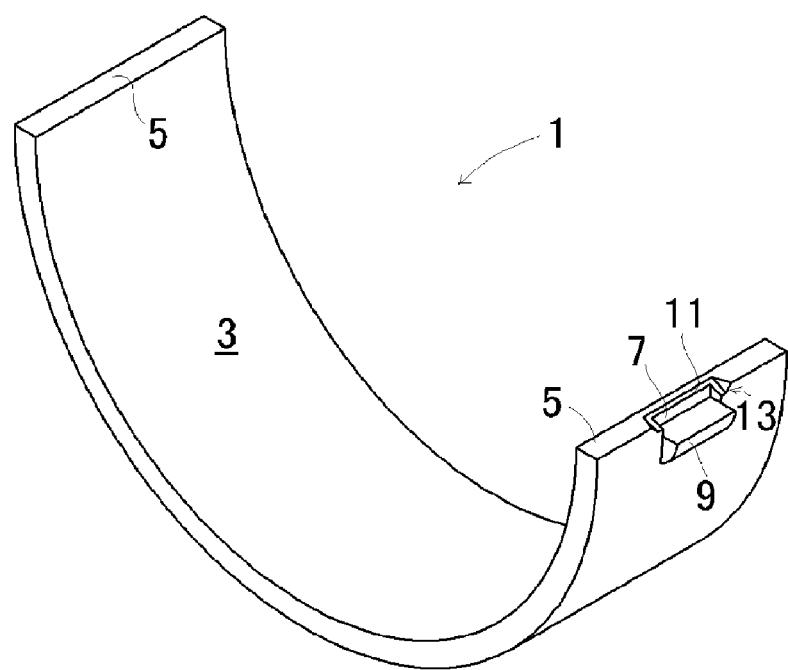
FIG. 1 is a perspective view showing a halved sliding bearing according to an embodiment of the present invention.

FIG. 1 is a perspective view showing a halved sliding bearing 1 according to an embodiment of the present invention.

The halved sliding bearing 1 has a semi-cylindrical bearing main body 3 as a main part and has a recess 7 on mating surfaces 5, 5 (upper end flat surfaces in FIG. 1) of the bearing main body 3. A positioning member 9 protrudes from a lower edge of the recess 7.

The recess 7 is formed from a central portion of an outer peripheral edge of one of the mating surfaces 5 in a direction perpendicular to the mating surface 5, i.e., in a circumferential direction of the bearing main body 3. Width of the recess 7 (length in an axial direction of the bearing main body 3) and depth of the recess 7 (length in the circumferential direction of the bearing main body 3) may be selected arbitrarily in accordance with width and protruding length required of the positioning member 9. For example, the width of the recess 7 may be 5 to 50% of the width of the mating surface 5 (which is also axial length of the bearing main body 3).

The position of the recess 7 may be also selected arbitrarily in accordance with a position for forming the positioning member 9. Also, the number of the recesses may be selected arbitrarily in accordance with the use. Also, the recesses may be formed on the mating surfaces on both circumferential sides. In the example of FIG. 1, the recess 7 is formed in the center of the mating surface 5. In another example of FIG. 13, the recess is formed near one end side of the mating surface 5.

Figure 2:
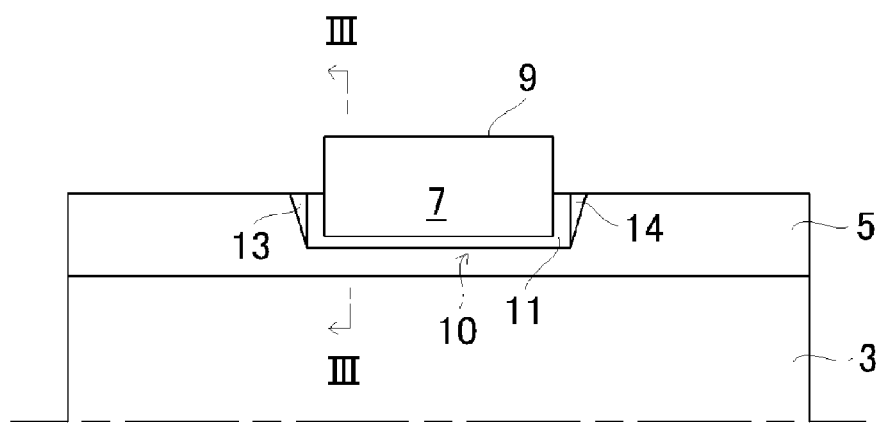
FIG. 2 is an enlarged plan view showing a recess 7 according to the embodiment.
Figure 3:
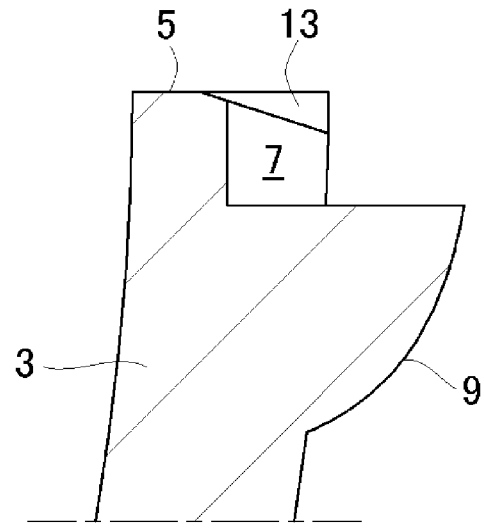
FIG. 3 is a cross-sectional view taken along the line III-III in FIG. 2.
Figure 4:
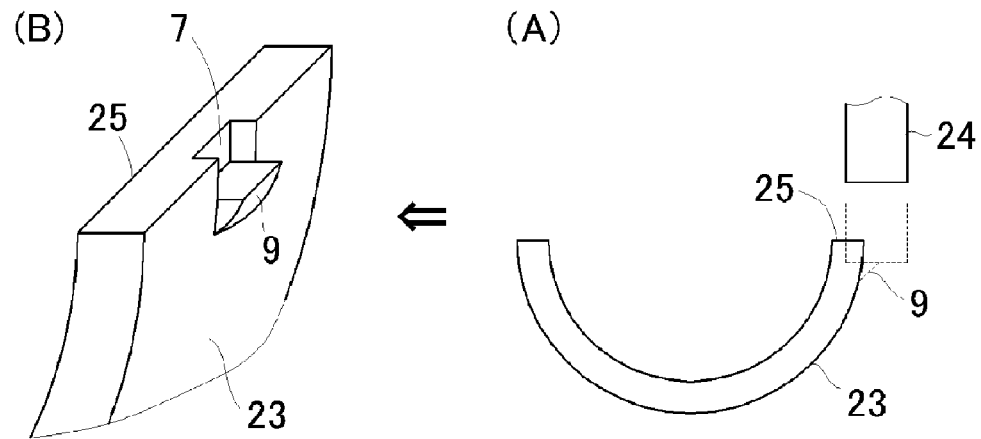
FIG. 4 is a schematic diagram illustrating a manufacturing method of the halved sliding bearing.

In the example of FIG. 1, the recess 7 is formed as a trajectory of a die that makes the positioning member 9 bulge (see FIG. 4(B)). Therefore, the shape of the recess 7 that opens on the mating surface 5 is maintained to the positioning member 9 as shown in FIG. 2.

In the case where the recess does not have the positioning member 9, the recess is formed by performing cutting from an outer peripheral edge of the mating surface 5 in a direction perpendicular to the mating surface 5, for example. The recess in this case is formed to avoid interference with a bolt and the like protruding from a counterpart member, and an arbitrary shape of the recess may be employed according to the purpose.

In the example of FIG. 1, the entire peripheral edge of the recess 7 opening on the mating surface 5 is cut, or chamfered. More specifically, a leading surface 11 is formed on the peripheral edge of the opening of the recess 7, and inclined surfaces 13, 14 are formed continuously from the leading surface 11 in the axial direction. The leading surface 11 and the inclined surfaces 13, 14 serve as a chamfered surface 10.

The material and the thickness of the bearing main body 3 may be selected arbitrarily according to its use and purpose. The bearing main body 3 may have a two-layer structure (bimetallic type), where an inner peripheral layer (sliding layer) may be made of an aluminum alloy or a copper alloy, and an outer peripheral layer (layer on which the recess is formed) may be made of an iron alloy.

Also, the diameter and the length of the bearing main body 3 may be selected arbitrarily according to its use and purpose.

Next, a manufacturing method of the halved sliding bearing 1 of the example of FIG. 1 will be described.

Firstly, a semi-cylindrical member 23 is prepared as an unprocessed body for the bearing main body 3 (FIG. 4(A)), and a die 24 is made to interfere with an outer peripheral edge of a mating surface 25 of the member 23 to form a protruding part 9 (FIG. 4(B)).

At that time, the recess 7 is formed as a trajectory of the die 24.

In a general manufacturing method, the circumferential end surface 25 of the work having the structure shown in FIG. 4(B) is cut to form a mating surface.

Figure 5:
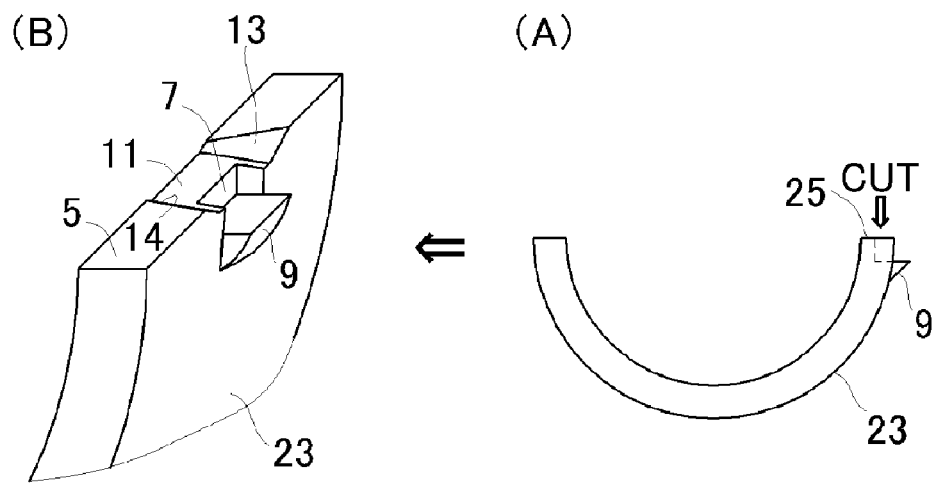
FIG. 5 is a schematic diagram illustrating a manufacturing method of the halved sliding bearing.

Then, as shown in FIG. 5(A), a part of the circumferential end surface 25 of the member 23 (i.e., the mating surface before finishing), on which the recess 7 opens, is cut.

In this example, the circumferential end surface 25 is cut by a cutting blade in the shape of a circular truncated cone while slightly inclining the cutting blade with respect to a thickness direction of the circumferential end surface 25. As a result, as shown in FIG. 5(B), a leading surface 11, which is flat and inclined with respect to the thickness direction of the circumferential end surface 25, is formed on a peripheral edge of the recess 7. The leading surface 11 is formed by a tip end portion of the cutting blade in the shape of the circular truncated cone. Inclined surfaces 13, 14 are formed on both sides of the leading surface 11. The inclined surface 13 is formed by a side surface of the cutting blade in the shape of the circular truncated cone.

Figure 6:
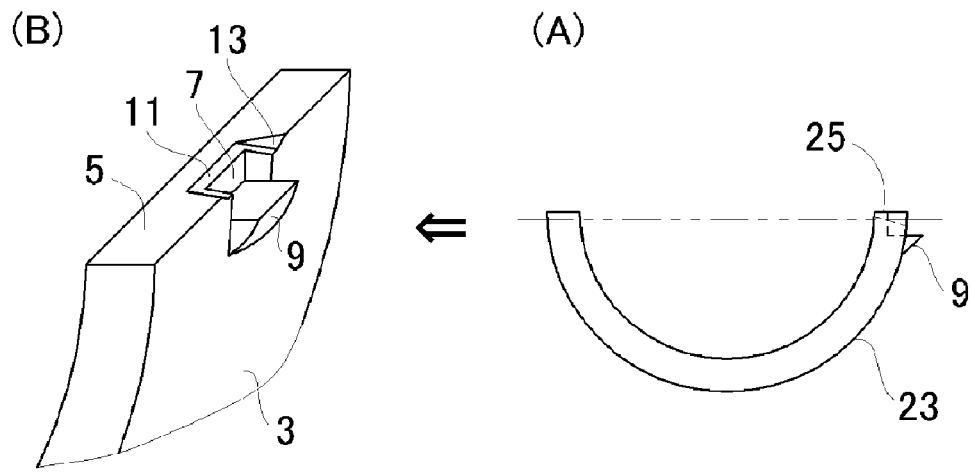
FIG. 6 is a schematic diagram illustrating a manufacturing method of the halved sliding bearing.

Then, the circumferential end surface 25 of the member 23 shown in FIG. 5(B) is cut along a plane, which is shown by an imaginary chain double-dashed line in FIG. 6(A), to form the mating surface 5. The imaginary chain double-dashed line should preferably pass through an axis line of an assembly, which is formed by combining the halved sliding bearing 1 with a counterpart member. The chamfered surface 10 should preferably not reach the inner peripheral surface. That is, in the case of the above example, it is preferable that the shape shown in FIG. 5(B), in which the leading surface 11 and the inclined surfaces 13, 14 open to the inner peripheral surface, does not exist when the mating surface 5 is completed. If the chamfered surface 10 does not reach the inner peripheral surface (i.e., if the mating surface 5 extends as a single continuous surface throughout the entire axial length), factors that may disturb an oil flow within the halved bearing 1 can be reduced. Also, risks of oil leakage and oil pressure drop can be reduced to the minimum. Therefore, the above shape is preferable in the use of the halved bearing 1.

FIG. 6(B) illustrates a result of the cutting.

The structure in FIG. 6(B) is substantially equivalent to the structure shown in FIG. 2. So, the same elements in both structures are indicated by the same numerals.

Figure 7:
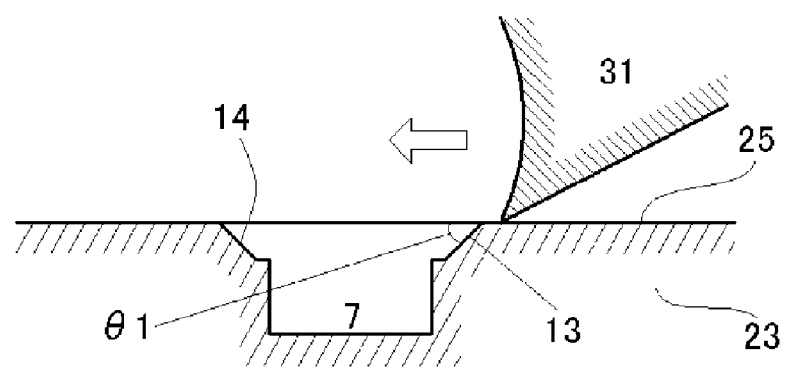
FIG. 7 is a schematic diagram illustrating a cutting process of a mating surface.

FIG. 7 schematically illustrates the cutting process of the mating surface shown in FIG. 6(A). Numeral 31 in FIG. 7 indicates the cutting blade, which is moved relative to the semi-cylindrical member 23 in a direction shown by an arrow mark.

The cutting blade 31 applies a force to the circumferential end surface 25 in a direction, in which the cutting blade 31 contacts the circumferential end surface 25 (i.e., a lower-left diagonal direction in FIG. 7), and rips off the material of the circumferential end surface 25.

Figure 8:
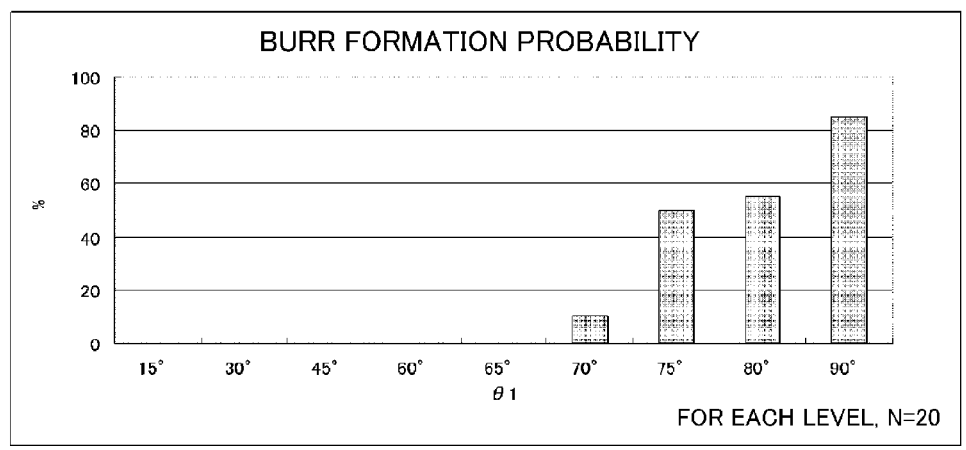
FIG. 8 is a chart illustrating an angle θ1 between the mating surface and an inclined surface and a burr formation probability.

The inventors of the present invention studied probability of burr formation in the case where the angle (chamfer angle) $\theta_1$ of the inclined surface 13 with respect to the circumferential end surface 25 is varied. The result is shown in FIG. 8. In FIG. 8, the sample size is 20 for each chamfer angle.

The result in FIG. 8 shows that when the chamfer angle $\theta_1$ exceeds 65 degrees, there is a possibility that the burr is formed also on the inclined surface 13.

According to the study by the inventors of the present invention, when the chamfer angle $\theta_1$ is smaller than 30 degrees, areas of the inclined surface 13 and the opposing inclined surface 14 increase, i.e., an area of the mating surface 5 decreases. Therefore, the chamfer angle $\theta_1$ smaller than 30 degrees is not preferable from the viewpoint of maintaining mechanical strength of the mating surface 5.

That is, a preferable range of the chamfer angle $\theta_1$ of the inclined surface 13 with respect to the circumferential end surface 25 is of between 30 and 65 degrees. The more preferable chamfer angle $\theta_1$ includes 45 degrees and approximately 45 degrees.

From a viewpoint of whether the burr is formed or not, the angle of the downstream inclined surface 14 does not matter very much.

Figure 9:
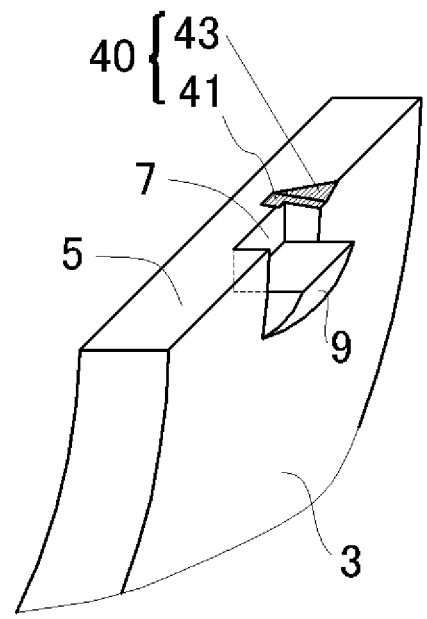
FIG. 9 is a perspective view showing a main part of a halved sliding bearing according to another embodiment.

FIG. 9 illustrates an example, in which a chamfered surface 40 (i.e., a leading surface 41 and an inclined surface 43) is formed only on an upstream part of the peripheral edge of the recess 7 opening on the mating surface 5 during the cutting and shaping of the mating surface. The leading surface 41 is formed also on a part of an inner side (i.e., a side closer to the center of the bearing main body) of the peripheral edge of the recess 7.

The chamfered surface 40 shown in FIG. 9 is formed by processing only a part of the peripheral edge of the recess 7 with a narrow cutting blade during the cutting shown in FIG. 5(A).

By employing such the configuration, a wide area of the mating surface can be secured.

Figure 10:
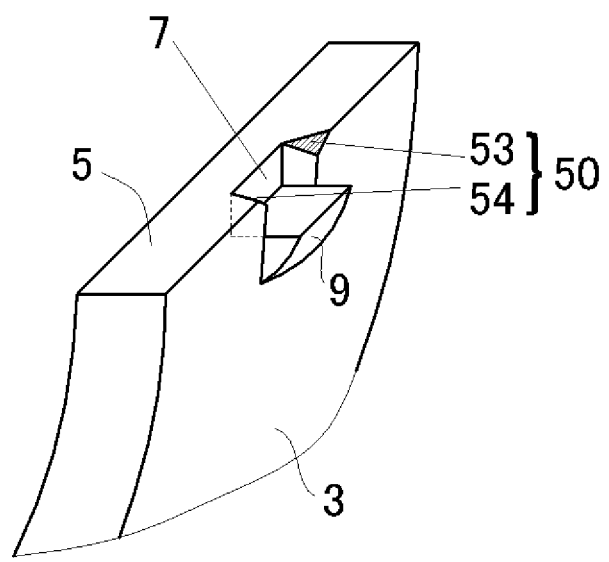
FIG. 10 is a perspective view showing a main part of a halved sliding bearing according to another embodiment.

In an example of FIG. 10, inclined surfaces 53, 54 are formed directly to an upstream edge and a downstream edge in the peripheral edge of the recess 7 opening on the mating surface 5. There is no chamfered part on the inner side of the peripheral edge of the recess 7. The wide area of the mating surface 5 can be secured also by employing such the configuration.

The chamfered surface 50 shown in FIG. 10 can be obtained by making only the side surface of the cutting blade interfere with the peripheral edge of the recess 7 and by controlling the positioning of the cutting blade with respect to the thickness direction of the mating surface 5 during the cutting shown in FIG. 5(A).

It is more preferable to intentionally omit the inclined surface 53 or the inclined surface 54 from a viewpoint of enlarging the area of the mating surface 5.

Figure 11:
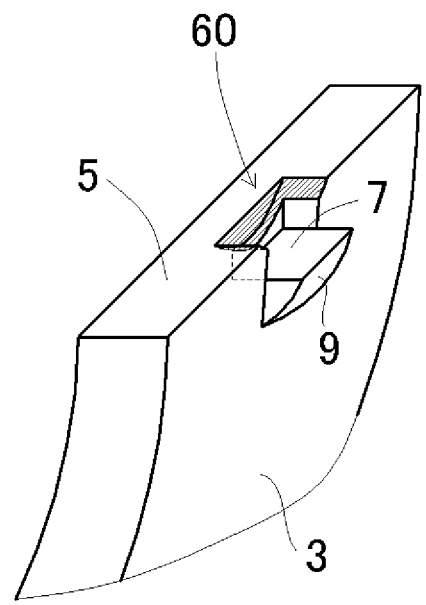
FIG. 11 is a perspective view showing a main part of a halved sliding bearing according to another embodiment.

An example of FIG. 11 illustrates a chamfered surface 60 formed by positioning a rotational axis of a rod-like rotational cutting tool (such as an end mill) parallel to the mating surface (or the radial direction of the bearing main body 3) and by moving the cutting tool in a direction perpendicular to the mating surface during the cutting shown in FIG. 5(A). The chamfered surface 60 has curved surfaces on an upstream side and a downstream side of the peripheral edge of the recess 7 in the axial direction of the bearing main body 3. Such the parts correspond to the inclined surfaces.

Figure 12:
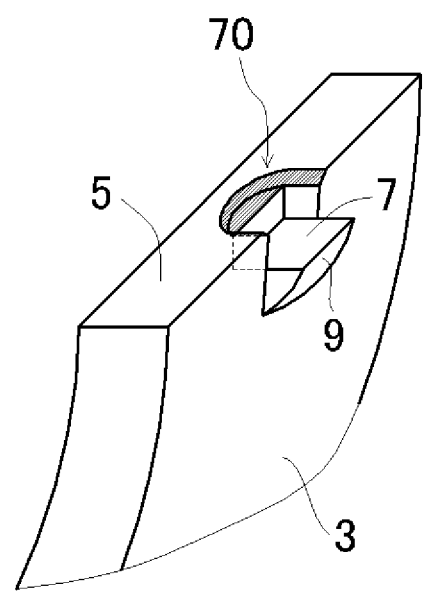
FIG. 12 is a perspective view showing a main part of a halved sliding bearing according to another embodiment.

An example of FIG. 12 illustrates a chamfered surface 70 formed by positioning a rotational axis of a rod-like rotational cutting tool (such as an end mill) perpendicular to the mating surface and by moving the cutting tool in a direction parallel to the mating surface during the cutting process shown in FIG. 5(A). In the chamfered surface 70, a surface including an entire peripheral edge that opens on the mating surface 5 corresponds to an inclined surface.

For example, the size of the rotational cutting tool may be changed in the shaping methods illustrated in the examples of FIGS. 11 and 12 as long as at least an upstream part of the peripheral edge of the recess 7 is chamfered to prevent the formation of the burr.

Figure 13:
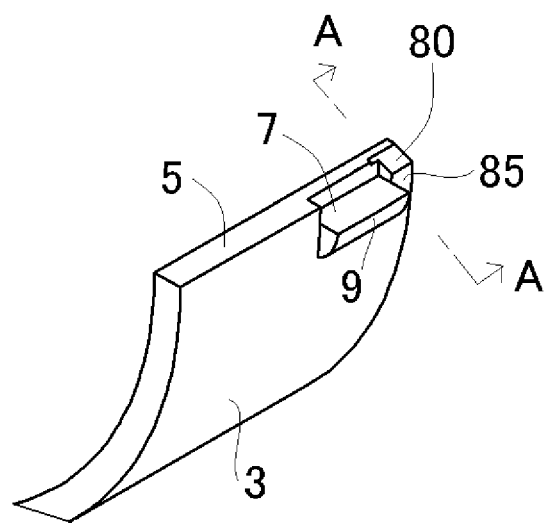
FIG. 13 is a perspective view showing a main part of a halved sliding bearing according to yet another embodiment.
Figure 14:
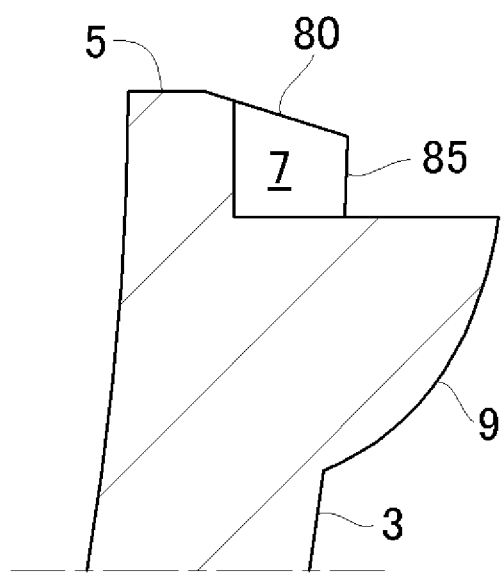
FIG. 14 is a cross-sectional view taken along the line A-A in FIG. 13.

FIGS. 13 and 14 illustrate an example of a halved sliding bearing according to another embodiment.

In this example, the recess 7 is formed eccentrically near one end side of the mating surface 5. An upper surface of a narrow wall part 85 provided between an end portion of the bearing main body 3 and the recess 7 is cut off in an inclined manner with respect to the thickness direction of the mating surface 5 as clearly shown in FIG. 14.

Such the cut-off surface 80 is obtained by cutting only the upper surface of the narrow wall part 85 during the cutting shown in FIG. 5(A). Such the cutting operation does not require high positioning accuracy, thereby providing preferable shaping performance. After the cut-off surface 80 is formed, the circumferential end surface 25 is cut from the narrow wall part 85 side to form the mating surface 5.

It is preferable that the flat surface as the mating surface 5 is left on an inner side (i.e., a side closer to the center of the bearing main body 3 in the radial direction) than the cut-off surface 80.

In this example, the upper surface of the upstream part (i.e., the narrow wall part 85) of the peripheral edge of the recess 7 opening on the mating surface 5 is cut off to prevent interference with the cutting blade used for cutting the mating surface. Accordingly, there is no material that would form the burr, so no burr is formed at all.

The present invention is not limited to the above description of the embodiments and examples of the invention. The present invention also includes various modifications that could be conceived easily by a person having ordinary skills in the art without departing from the scope of claims.

All of contents of articles, patent application publications, patent gazettes and the like clearly described in the specification are incorporated herein by reference.

[Description of the Numerals]
1 Halved sliding bearing
3 Bearing main body
5 Mating surface
7 Recess
9 Positioning member
11, 41 Leading surface
13, 14, 43, 53, 54 Inclined surface
10, 40, 50, 60, 70 Chamfered surface

The invention claimed is:

1. A method for manufacturing a semi-cylindrical halved sliding bearing, which has a recess formed in a circumferential direction from an outer peripheral edge of a mating surface of a bearing main body of the halved sliding bearing, the method comprising the steps of:
    preparing a semi-cylindrical member as an unprocessed body of the bearing main body, wherein the recess opens on a circumferential end surface of the member, wherein at least one edge segment of a peripheral edge of the recess intersects with an axial direction of the member, and wherein an entirety of the at least one edge segment is chamfered; and
    forming the mating surface by cutting the circumferential end surface such that a cutting blade firstly reaches the chamfered edge segment in the peripheral edge of the recess, thereby producing the bearing main body.

2. The manufacturing method according to claim 1, wherein the preparing the member includes the steps of:
    forming the recess in the circumferential direction from the outer peripheral edge of the circumferential end surface of the member; and
    chamfering the peripheral edge of the recess, which opens on the circumferential end surface, after the forming the recess.

3. The manufacturing method according to claim 2, wherein a chamfer angle with respect to the circumferential end surface is of between 30 and 65 degrees.

4. The manufacturing method according to claim 2, wherein the chamfering includes cutting.

5. The manufacturing method according to claim 2, wherein the chamfering includes chamfering an entire peripheral edge of the recess, which opens on the circumferential end surface.

6. A halved sliding bearing comprising:
a semi-cylindrical bearing main body; and
a recess formed in a circumferential direction from an outer peripheral side of a mating surface of the bearing main body, wherein
at least one edge segment of a peripheral edge of the recess, which opens on the mating surface, intersects with an axial direction of the bearing main body, and
an entirety of the at least one edge segment having a surface different from the mating surface and different from the recess.

7. The halved sliding bearing according to claim 6, wherein the peripheral edge of the recess is chamfered.

8. The halved sliding bearing according to claim 7, wherein an entirety of the peripheral edge of the recess, which opens on the mating surface, is chamfered.

9. The halved sliding bearing according to claim 8, wherein the peripheral edge of the recess, which opens on the mating surface, has a chamfer angle of between 30 and 65 degrees.

10. A method for manufacturing a semi-cylindrical halved sliding bearing, which has a recess formed in a circumferential direction from an outer peripheral edge of a mating surface of a bearing main body of the halved sliding bearing, the method comprising the steps of:
forming the recess near one end side of a circumferential end surface of a semi-cylindrical member, which serves as an unprocessed body of the bearing main body;
cutting the circumferential end surface between the recess and an end portion of the member on the one end side; and
forming the mating surface by cutting the circumferential end surface from the one end side, thereby producing the bearing main body.

11. A halved sliding bearing comprising:
a semi-cylindrical bearing main body; and
a recess formed in a circumferential direction from an outer peripheral side of a mating surface of the bearing main body, wherein
at least one edge segment of a peripheral edge of the recess, which opens on the mating surface, intersects with an axial direction of the bearing main body,
an entirety of the at least one edge segment having a surface different from the mating surface and different from the recess, and
the halved sliding bearing is manufactured by a method comprising the steps of:
preparing a semi-cylindrical member as an unprocessed body of the bearing main body, wherein the recess opens on a circumferential end surface of the member, wherein at least one edge segment of a peripheral edge of the recess intersects with an axial direction of the member, and wherein an entirety of the at least one edge segment is chamfered; and
forming the mating surface by cutting the circumferential end surface such that a cutting blade firstly reaches the chamfered edge segment in the peripheral edge of the recess, thereby producing the bearing main body.

* * * * *